April 25, 1961 R. L. GARWIN 2,981,940

COMMUNICATION SYSTEMS

Filed March 11, 1957 3 Sheets-Sheet 1

INVENTOR
RICHARD L. GARWIN
BY John A. Hall
ATTORNEY

April 25, 1961 R. L. GARWIN 2,981,940

COMMUNICATION SYSTEMS

Filed March 11, 1957 3 Sheets-Sheet 3

United States Patent Office 2,981,940

Patented Apr. 25, 1961

2,981,940

COMMUNICATION SYSTEMS

Richard L. Garwin, Scarsdale, N.Y., assignor to International Business Machines Corporation, New York, N.Y., a corporation of New York Filed Mar. 11, 1957, Ser. No. 645,303

3 Claims. (Cl. 340—310)

This invention relates to communication systems and particularly to high frequency signaling systems.

The object of the invention is to provide a signaling system which may be employed to control electrical apparatus at distant points and to receive assurance of the response therefrom by signals carried over transmission lines used mainly for other purposes.

The invention in its rough outlines consists of the combination of three components, (1) a source of alternating current of a moderately high frequency, (2) a detector for responding to potential variations in said alternating current, and (3) a means for causing potential changes in said alternating current, all characterized in this that these three components have no necessarily direct connection one with another excepting that each is connected to the same transmission circuit which may be employed for any one of several conventional purposes such as the transmission of electrical power, or the transmission of telephone, telegraph or other types of signals.

It is conventional to employ what is known as a carrier current to effect control of distant apparatus and it is further conventional to do this on a selective basis whereby any one of a plurality of different units of apparatus may be individually controlled by the transmission of a carrier current over a common channel. Reference is made to the Wagner et al. Patent 2,647,360, issued August 4, 1953, as showing a signal generator, and to the Bradley Patent 2,700,757, issued January 25, 1955, and the Sprecker et al. Patent 2,754,495, issued July 10, 1956, as showing selectively operated signal receivers capable of operation by the transmission of a carrier current. This carrier current is of a high frequency whose value is chosen as being the least likely to be present among the harmonics of the power supply or the modulations thereof caused by the operations of the devices powered thereby.

The present invention consists of means at each of the said distant devices for signalling its operation by modulating at said distant point the said high frequency signaling current and the use of a receiver at the control station for detecting this modulation.

The high frequency signaling current, which by way of example, may be 3510 cycles per second, may be applied to the power line at any given point. Detectors which will respond to a given potential value of this signal current may also be applied to the power line at any given point which may or may not coincide with the point of application of said current. Signal-current modulating means likewise may be applied to said line at any given point so that the system in its broad aspects consists of three components, a signal-current generator, a modulator and a detector connected at random to different points along a transmission line.

In general, the operation of the system is broadly analagous to employing the effects of poor regulation in a power distribution system, for the detectors look for potential changes in the level of the signaling current supply on the transmission line caused by the modulation thereof and made effective by the internal impedance of the signal current generator.

Modulation may be effected by the use of resonant circuits at the modulation stations and in some cases may be absorption modulation in which the resonant circuit causes changes between low and high current values or, alternatively, may be admittance modulation in which the phase is changed from point to point along the peak of the curve representing intensity of the signaling current with respect to frequency. If this modulation is carried out at a given rate, say by way of example, at 17 cycles per second, then there will be produced two side bands 3527 and 3493 cycles per second respectively, which a sharply tuned receiver may detect.

Adjustable means is provided at each of the modulating stations for adjusting a series resonant circuit thereat so that at the point where the source of high frequency is connected to the line such distant modulating means will appear to vary in a manner to produce alternations between a maximum and a minimum current flow. Due to various conditions of the transmission line itself and to the nature of the load it carries, what may appear to be phase modulation at the modulator will appear as amplitude modulation at the frequency source, and vice versa. Alternatively, a standard device may be used as a modulator and several receivers may be used near the frequency source each differently adjusted, one to respond to amplitude modulation and another to respond to phase modulation whereby the modulating signal regardless of its distortion by line conditions may be detected by one or another of said receivers.

Furthermore the selective devices heretofore noted may be employed to provide specific interrogation, that is the modulation means may be caused to operate at a given time and over a given period so that when a modulation signal is detected, the operator may be certain that it is being transmitted from a specific source.

Various arrangements are employed. In one form of the invention the specific interrogation period during which the carrier current is modulated and during which the detector is employed to look for the effects of this modulation may be coupled with and be a function of the coded setting or release of an apparatus unit, whereas in another form it may be specifically coded so that the state of an apparatus may be observed at the will of an operator.

A feature of the invention is an answer back device consisting essentially of a circuit tuned to a particular frequency coupled with mechanical means for varying the inductance of said tuned circuit at a given rate whereby side bands of said particular frequency plus and minus said given rate may be produced. The mechanical means may take any one of a plurality of different forms, such as a simple pair of contacts controlled to open and close at said given rate, a magnetic core having an inductive winding linked therewith and provided with an air gap through which the serrated edge of a disc (somewhat like the ubiquitous electric light meters) is caused to move at a given rate, or a ferrite cylinder associated with a ferrite cap both of which are provided with teeth somewhat like the teeth of a crown gear and in which the said cap is caused to rotate at a given rate and in which the rotating axle by which the cap is moved is interlinked with a coil, or any other form of a device for mechanically varying the value of the inductance of a circuit component. In a preferred form of the invention the mechanical movement required is produced by a small synchronous motor which on specific interrogation may be coupled with a conventional source of power feeding the controlled unit so that if the said unit is "on" this small synchronous motor will go into operation but if the said unit is "off," will fail to operate thus producing a modulation effect at a distant point which will clearly indicate the "on" or "off" state of the controlled unit.

Alternatively, a selectively operated specific interrogation means may be employed merely for the purpose of attempting to cause the operation of a distant modulating means so that if a distant apparatus unit is "on," the modulating means will operate and produce one kind of signal or if it is "off," will fail to operate. By such a means the state of a device as "on" or "off," or as above or below a given level, may be observed by an operator from time to time.

Basically, when the modulating device is tuned to resonance, the current flow therethrough will rise to a maximum value so that the modulator alternatively tuned to an off resonance produces current variations which at the point where the source of carrier current is connected to the transmission line will cause a corresponding variation in the potential thereof.

Another feature of the invention is a means for carrying out a specific interrogation. The means for producing a modulation of the carrier current at a distant point when an apparatus unit at such distant point is "on" and for producing no such modulation when the apparatus unit is "off," on a continuous basis is fundamentally possible and operative but is unnecessary since it is not wished to continuously observe the state of such a unit. Moreover, it is of greater importance to control a plurality of apparatus units and hence means is provided to produce this modulation effect only for a limited time and at a specific one of said apparatus units. Through conventional selective means any particular modulating device may be rendered operative at any particular time for a short given interval so that the operator may by such specific interrogation induce an answer back signal which will indicate the "on" or "off" state of a particular apparatus unit.

Another feature of the invention is a means for automatically carrying out a specific interrogation as a part of a control operation so that by a given selective operation a distant apparatus unit may be turned "on" or "off" and the modulation device may thereafter and as part of the operational cycle be also turned "on" to give an immediate indication of the response of the distant apparatus unit.

Another feature of the invention is a means to hold the source of frequency normally unloaded. Since the drop in potential of said source as applied to the transmission line upon the application of a load is fundamentally the effect which is employed as a signal, and since such effect is to be produced by any one of a plurality of modulating devices, it is essential that the line should not be loaded by such devices at rest. The simplest and most satisfactory means for this purpose is a switching device incorporated in the specific interrogation means for connecting the modulating means to the line only over the period provided for its operation. The invention, however, encompasses other means such as one for mechanically insuring that the modulating means comes to rest and normally presents a minimum load circuit to the common transmission line, so that no one of the modulating circuits will interfere with the working of another.

It is to be understood that this invention is not limited to application to an electrical transmission line and that the term "line" will be taken to mean any conventional channel over which the electrical signals of the present invention may be transmitted either directly or as translated into other forms necessary for transmission thereover.

Other features will appear hereinafter.

The drawings consist of three sheets having eight figures, as follows.

Figure 1:
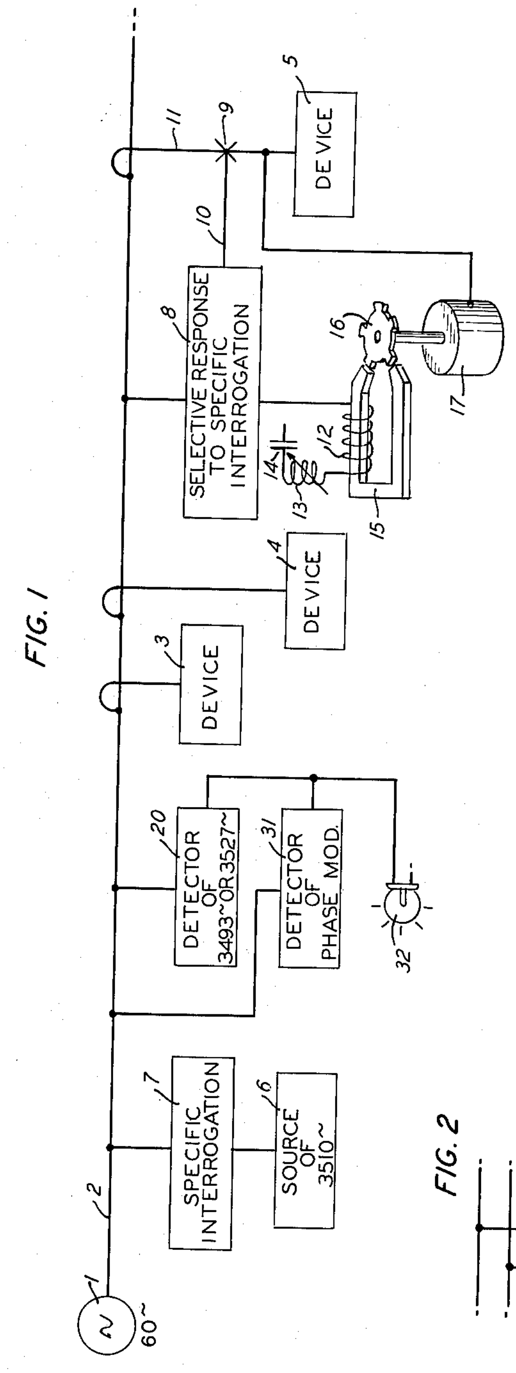
Fig. 1 is a schematic circuit diagram showing the essential components of the invention expressed by blocks where conventional apparatus is employed and by highly schematic circuits elsewhere.

In the drawings there is a schematic showing of a source 1 of commercial 60 cycle current feeding into a transmission line 2 from which, at various distant points, devices 3, 4 and 5 may be operated.

There is also shown, connected to the transmission line 2, a source of high frequency current 6, marked by way of example as having a value of 3510 cycles per second. This value has been chosen as one which is least likely to be matched by any multiple or harmonic value of the sixty cycle current when this is held to a reasonable stability or matched by any such value induced by the switching on or off, or the operation of any of the devices 3, 4 or 5.

The showing in Fig. 1 is purely schematic, no attempt being made to show actual circuits but only to indicate the circuit relations of the various components. Thus the source 1 of 60 cycle power is indicated as feeding into the line 2 and the conventional devices 3, 4 and 5 are indicated as deriving power therefrom. Those components which are used as parts of the present invention are branched directly downward from the line 2 and those components which are present but play no direct role in the invention, such as the device 3, are branched off by a half loop. No attempt is made to show a complete or return circuit. Thus the single wire to operate the motor 17 represents a proper circuit, the terminal at the right of condenser 14 represents a proper return circuit and the second teminal of the signal lamp 32 represents a connection to a proper source of power. Where a more or less complete circuit is necessary, more details are shown as the two wires of a line in Fig. 2 and the four terminals of a three phase power line in Figs. 6 and 7.

Figure 4:
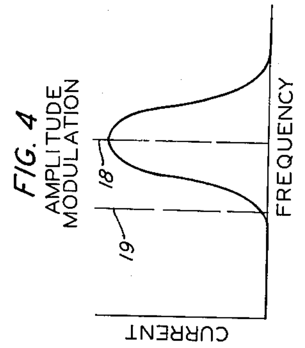
Fig. 4 is a graph showing the relation between current and frequency in a series resonant circuit and indicating the limits set for absorption or amplitude modulation.

While the fundamental conception of the present invention contemplates a direct and permanent connection of the source 7 to the transmission line 2, other considerations including a particular mode of operation requires that the source 6 be applied to the line 2 in short intervals and on a temporary basis and hence a device 7 marked "specific interrogation" is shown as interposed between the source 6 and the line 2. This may be in the form of a means, such as shown in the Wagner patent hereinbefore set forth, to apply the source 6 in a train of timed pulses designed to bring a selective response by one or another device such as the device 8, which may be employed to turn the device 5 "on" or "off" by switching means indicated by the X at the junction of the circuits 10 and 11. In this Fig. 1 the device 8 is also shown as a means for establishing a circuit from the source 6 into a series resonant circuit consisting of an inductance 12, a variable inductance 13 and a capacitor 14, which may be tuned to resonance with the current supplied by the source 6. The inductance 12 is shown as a coil about the core 15 which is provided with an air gap in which a disc 16 is moved by a synchronous motor 17 to change the tuning of the series resonant circuit as desired. Fundamentally, this tuning is to be varied as indicated in Fig. 4 between a value 18 where by exact resonance the greatest current will flow from the source 6 into the series resonant circuit and the value 19 where the least current will flow from the source 6 into the series resonant circuit.

Such current variation between a high and a low value will, through the internal impedance of the source 6 cause a corresponding variation of the potential of the high frequency current as it appears on the transmission line 2 and this potential variation may be detected and recognized as a signal.

In order to make such signal certain as a signal and to avoid recognition of some fortuitous disturbance on the transmission circuit as a signal, two measures are employed. First, as hereinbefore set forth, the frequency of the signaling current is chosen as a value least likely to be present as a multiple or harmonic of the power source or any variation thereof caused by the nature or the operation of the devices switched on and off the said transmission line. As part of this plan, the frequency by which the said high frequency current is modulated is also chosen to be a value least likely to be duplicated by any attribute or operation of the power line.

It will be understood that the values 3510 cycles per second and 17 cycles per second herein set forth, are by way of example only and that other values fall within the spirit of the invention.

A second measure taken is to carry out the modulating operation for at least a period of a minimum duration which is unlikely to be duplicated by any fortuitous disturbance on the line. It will be recognized that some switching operation may cause a potential spike which might well enter even a sharply tuned receiver but it is extremely unlikely that a series of such spikes will be produced over a material period and with the necessary regularity to simulate the planned signal. Therefore, the specific interrogation device 7 is arranged to transmit the coded set of selecting pulses and then to connect the source 6 to the line 2 for a given minimum period over which the motor 17 operates to vary the impedance of the series resonant circuit at the given rate of 17 cycles per second under control of the receiver 8.

During these periods a sharply tuned detector 20 also connected to the transmission line 2 will detect the potential variations of the high frequency current from the source 6. To be certain that a proper signal is being received, the detector 20 may be sharply tuned to one of the sidebands produced by the 17 cycle per second modulation of the 3510 cycle per second frequency, that is, to either 3493 cycles per second or to 3527 cycles per second.

It is to be noted that the sidebands are not necessarily received on an absolute frequency basis, but relative to the transmitted carrier frequency, thereby allowing frequency drift in the transmitter and in the receiver without interfering with the proper reception.

It is to be particularly noted that the three components of this system, the source 6, the detector 20 and the modulating means including the series resonant circuit 12, 13 and 14, are connected to the transmission line at random points. It will, however, be understood that certain practical and commercial considerations will dictate the connection of the devices 6 and 20 to the line 2 near to each other and perhaps to incorporate the circuits thereof into a single compact device.

The modulating means may take any one of several various forms. In Fig. 1 it is shown as a disc 16 moving within an air gap in the magnetic circuit with which the impedance coil 12 is linked. The disk 16 may be so formed with respect to the speed of the synchronous motor 17 that the variations in the tuning of the associated series resonant circuit are carried out at the rate of 17 cycles per second.

Figure 2:
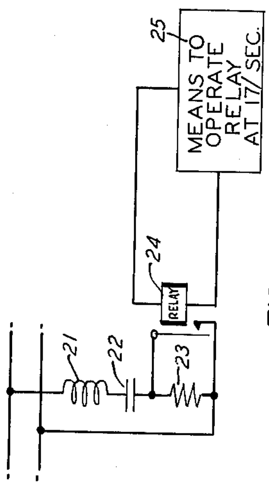
Fig. 2 is a schematic circuit diagram showing one simple manner of producing a modulation effect at a given rate.

Another form of modulating means is shown in Fig. 2, where a series resonant circuit consisting of an impedance coil 21, a capacitor 22 and a resistor 23 is controlled by a simple relay 24 controlled by a means 25 to operate at a rate of 17 times per second. When the relay contacts are open, the resistor 23 will be included in the circuit and little current will flow therethrough, but when the contacts are closed the resistor 23 will be excluded therefrom and the other two components, carefully selected to produce resonance at 3510 cycles, will act to absorb a maximum current which in turn will cause a corresponding potential drop on the line.

Figure 3:
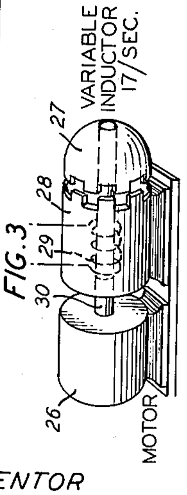
Fig. 3 is a partially perspective drawing of an apparatus unit for producing a modulation effect at a given rate.

Still another form of modulating device is shown in Fig. 3 where a motor 26 is provided to cause a cap 27 to rotate. An impedance coil 29 is interlinked with the stem 30 by which the motor drives the cap 27, and this coil is placed within a cylindrical and stationary body element 28. The body element 28 and the cap 27 have dentils very much like the teeth of crown gears so that as the cap 27 revolves, the reluctance of the magnetic circuit with which the coil 29 is interlinked will be periodically varied. This variation may be adjusted to a rate of 17 per second for the purposes hereinbefore stated.

It has hereinbefore been stated that by amplitude modulation as depicted in Fig. 4, a corresponding potential variation of the high frequency current may be produced on the transmission line 2. Practical and commercial considerations induced by various conditions in the line 2 may cause a distortion of the current so that what would appear as very favorable amplitude or absorption modulation at the distant point, might become phase modulation at the connection of the source 6 in which case another type of detector 31 would have to be used. Where a plurality of modulators are employed at various points along the line it might be necessary to provide a plurality of detectors 20 and 31 each constructed and arranged to detect a different effect, particularly where the line conditions may change with the varying industrial load placed thereon. A plurality of such detectors are so constructed and arranged that at least one thereof will produce a definite response and since all may work a common signal device 32, a detection of a distant modulating operation will be certain.

Figure 5:
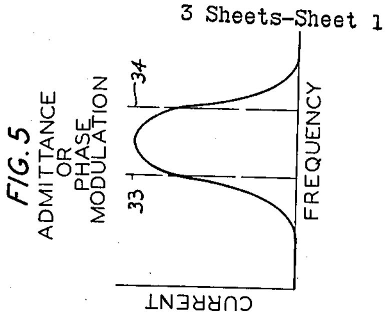
Fig. 5 is a similar graph having indications of the limits set for admittance or phase modulation.

Alternatively, where it is found that the distortion is mostly due to factors in the line and not caused by the devices which load the line, it is more expedient to adjust the modulating means each separately so that but a single detector 31 may be used. The two extremes are shown by Figures 4 and 5 respectively. Fig. 4 shows, as hereinbefore explained, the conditions of absorption or amplitude modulation where the modulating device is adjusted to vary the response between low and high current values. Fig. 5 shows the conditions of admittance or phase modulation where the intensity of the current is little changed, but where the phase is changed from a leading to a lagging current. It has been found that what appears to be phase modulation at the distant end will appear to be amplitude modulation at the point where the detector is connected to the line, for the distortion caused by line factors merely moves the limits 33 and 34 to other positions, such as 18 and 19 respectively.

In Fig. 1, by way of example, the variable inductor 13 is shown as a component of the series resonant circuit. By the use of this device the limiting values, either 18 and 19 in the one case, or 33 and 34 in the other case, or other limiting values which will produce a workable and desired effect at the receiver may be fixed.

Certain specific details of components of the present invention may be found in the remainder of the figures. The specific interrogation device consists essentially of key means operable by an attendant to apply the source of 3510 cycles per second to the channel used in coded impulses suitable for the operation of the receiving devices shown in the Patents 2,700,757 and 2,754,495, there being one key for transmitting each specific code.

The specific interrogation device could be an adaptation of the keying means used by Davidsmeyer et al., Patent 2,675,535, issued April 13, 1954, or it might be any one of a number of similar code senders well known in the prior art, including such a simple means as a telegraph key.

Figure 6:
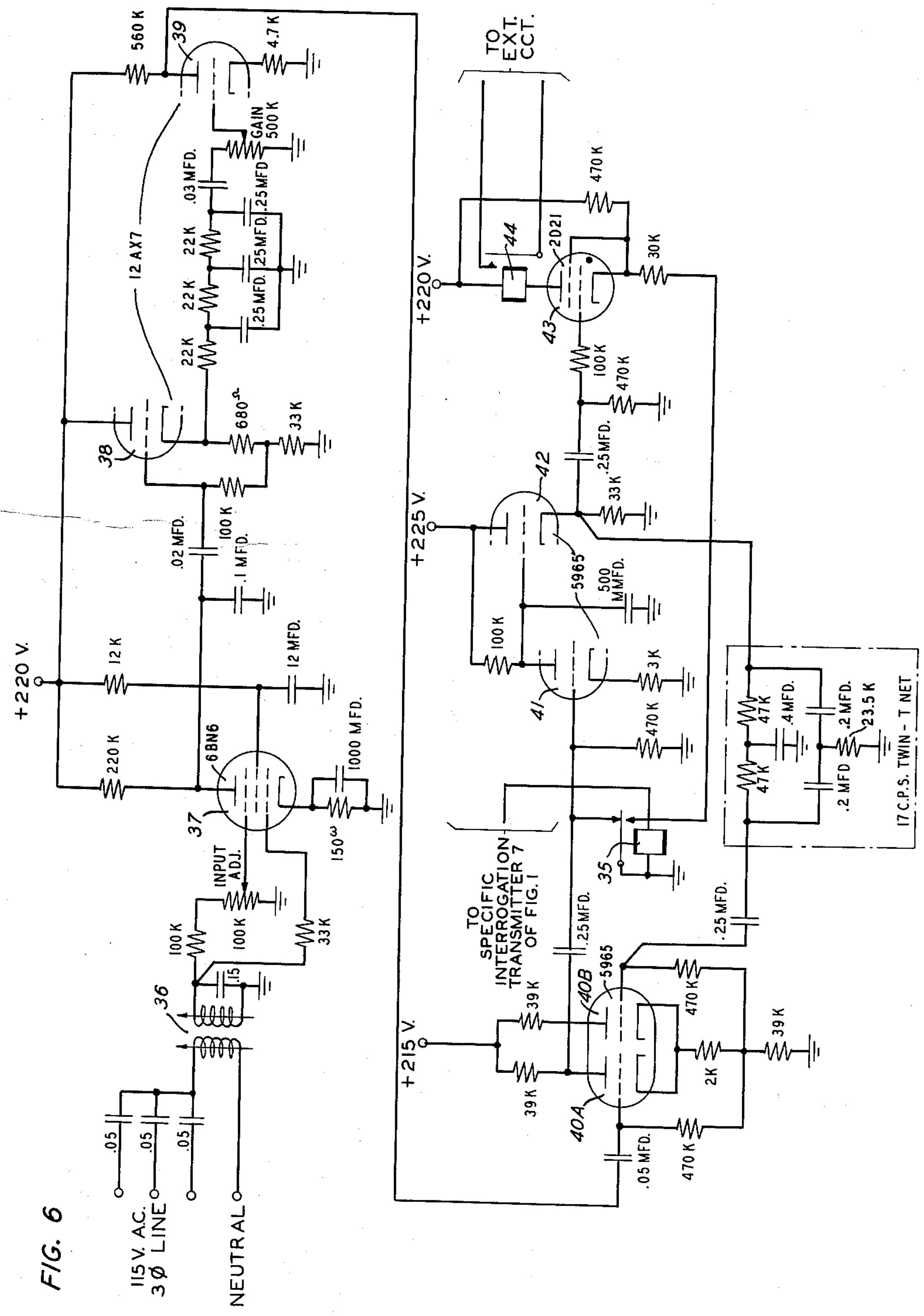
Fig. 6 is a schematic circuit diagram of the internal connections of an amplitude detector.

A relay 35 shown as having a control of the circuits of Fig. 6 is one which may be operated directly from the specific interrogation key means or, if the detector of Fig. 6 is at a distance, from the key panel then from a resonant circuit means such as shown in the Sprecker et al. Patent 2,754,495. In either case the relay 35 is slow to operate, that is, it is timed to move its armature 150 to 200 milliseconds after the transmitter is keyed, in order to prevent a transient from entering the detector at the beginning of the operation and causing a false operation. With this understanding of the action of relay 35, let us look at the detector of Fig. 6. Here the circuit is shown attached to a three phase power line by means of a transformer 36. The 3493 cycle or 3527 cycle signal to which it is tuned will enter the input grids of the tube 37 which serves as a synchronous detector. An unfiltered 17 c.p.s. output from tube 37 is coupled to a cathode follower tube 38 and the output of this traverses a low pass filter which serves to attenuate all frequencies above sixty cycles. The resultant signal passed by the low pass filter is coupled to the grid of a voltage amplifier tube 39 and the output of this in turn passes to the grid input of tube 40A. The tubes 40A and 40B serve as a differential amplifier. The output of tube 40A at its plate is coupled to an amplifier tube 41, so that after the relay 35 has operated the output of tube 41 is fed to a cathode follower tube 42. The cathode output from this latter tube feeds in to a 17 c.p.s twin-T network which serves to filter the 17 c.p.s. signals and pass the other frequency signals to the differential amplifier tube 40B.

The tubes 40A, 40B, 41 and 42 function to amplify the 17 c.p.s. signal and attenuate other signals passed from tube 39.

It may be noted, as hereinbefore mentioned, that the output from tube 40A is normally connected by a back contact of the relay 35 to ground which functions to ground the initial surge of the signal received by the detector circuit which, if passed, might block the detector. After a predetermined delay, relay 35 becomes energized and permits the signal to be fed to the control grid of tube 41.

The output from the cathode of tube 42 is also coupled to the input grid of the thyratron tube 43 which, when active, operates relay 44. Relay 44 may be employed to cause a display by the signal lamp 32 (Fig. 1), or to operate any other conventional signaling means to report an unstandard condition.

Figures 7, 8:
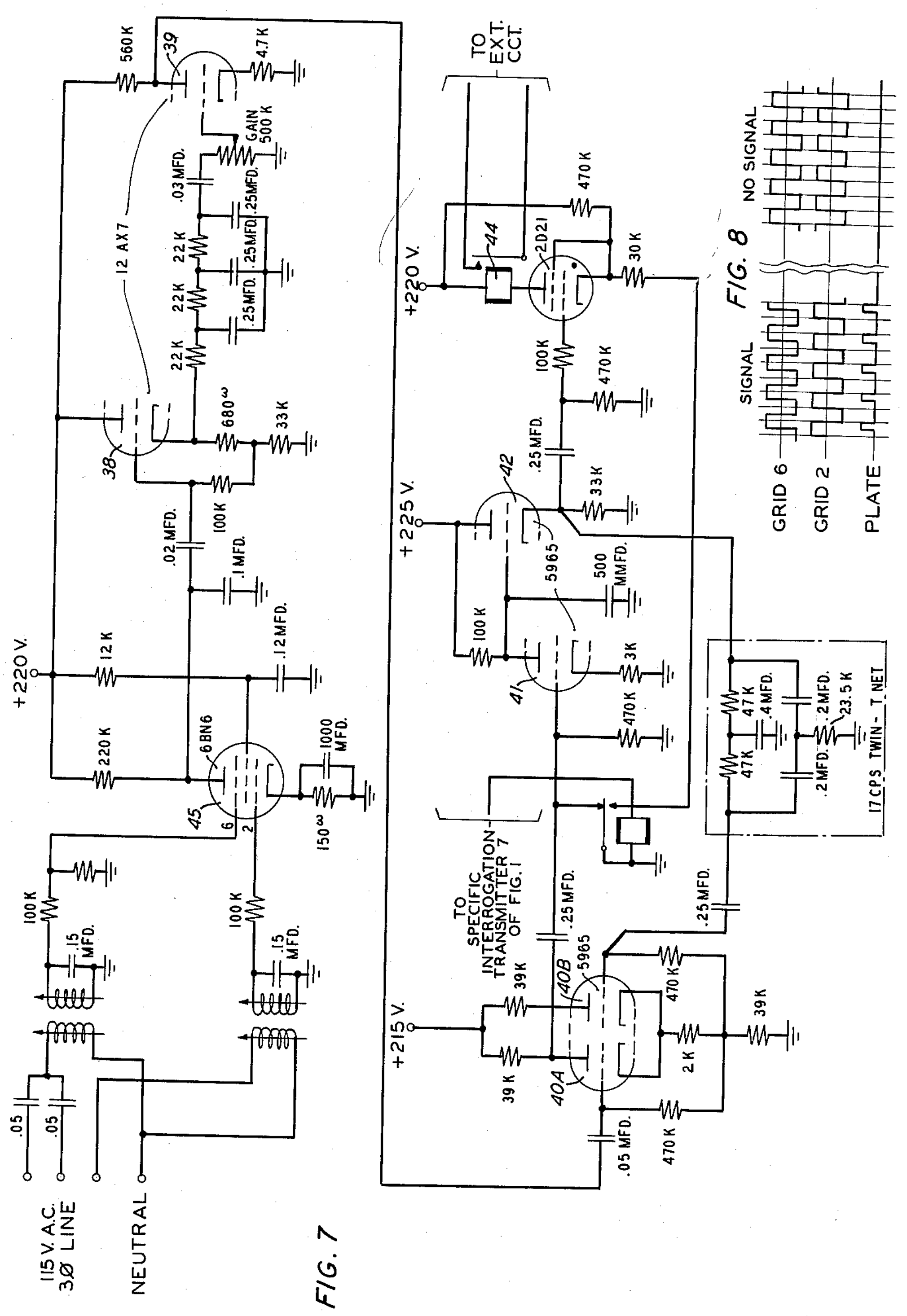
Fig. 7 is a schematic circuit diagram of the internal connections of a phase modulation detector.
Fig. 8 is a set of graphs (idealized) showing the manner in which a phase shift caused by a distant modulator is translated into a signal by the circuitry of Fig. 7.

Fig. 7 shows a modulation detector of a somewhat different construction and arrangement which may be used for the detection of phase modulated signals. In this detector the input to the first tube 37 differs from the arrangement of Fig. 6, but the remainder of the circuit is identical with that described. The circuits controlled by the relays 44 may be multipled as indicated in Fig. 1 so that one or the other of these detectors responding to the signal may produce the desired indication.

In a system where the conventional transmission line is in a three phase network, by way of example, if the mutual impedance across which the answerback or reply voltage is detected is essentially a pure inductance (as is often the case with the leakage inductance of the supply transformer) the modulated carrier voltage due to a varying absorption is in quadrature with the supply voltage and no amplitude modulation will be detected, since only phase modulation is present. The phase modulation must, of necessity, be detected with an unmodulated reference signal shifted 90° in phase with respect to the phase modulated signal. If any modulation is only on a single phase of the mutual impedance and the modulators are tuned to resonance, the circuit arrangement of Fig. 7 may be employed. One input grid of the tube 45 (corresponding to the tube 37 of Fig. 6) is tuned slightly above resonance and a second input grid is tuned slightly below so that there is a phase difference of about 90° between the voltages on these two grids whereby no incoming signal will produce no output from the tube. It is to be noted that in this phase detector the voltages on the grids of the tube 45 are large, as limiting is desirable whereas in the previously described amplitude detector one of the grids must operate in the linear range. The operation of the tube 45 is depicted by the three graphs of Fig. 8 in which the effect produced at the plate of the tube under the different conditions of the two grids is shown to be similar to the effect elsewhere produced in the amplitude detector. From this figure it appears that a relative phase shift at the grids is translated into an amplitude modulation at the plate. The sensitivity of the two detectors of Fig. 6 and Fig. 7 is about equal and both could in fact feed into the same tuned amplifier, that is, the circuitry beyond the tube 37 of Fig. 6 and that beyond the tube 45 of Fig. 7, through, to avoid confusion, they are herein shown as entirely separate circuits except for the external connections, one to operate the relay 35 and another to operate an indicator from the relay 44.

It will also be apparent from Fig. 8 that the size or the width of the plate signals will change gradually as the signal in grid 6 from a minimum of no signal to a maximum of a full width signal so it will appear that there is a great tolerance in this arrangement where a narrow plate pip will be sufficient to produce a proper operation of the signal relay 44. The difference between the "signal" and "no signal" shown in Fig. 8 is by way of example only. It will, moreover, be understood that the signal produced as a train of pulses at the plate will be smoothed in the following circuitry to a signal sufficiently continuous in nature to operate the relay 44 without chatter.

It is to be noted that with stable modulators and stable phase relations at the modulators, the modulators may be detuned to produce amplitude modulation at the detector, but if line conditions between the modulators and the detectors are uncertain or variable then a complete circuit such as that of Fig. 6 and another such as that of Fig. 7 must be used as described.

What is claimed is:

1. A communication system comprising a transmission line for conventional usage and connected to said line at random points, (1) a source of high frequency current, (2) means to modulate said high frequency current, and (3) a detector of modulated high frequency current, characterized in this that a specific interrogation device consisting of selecting means and means to complete a connection over a predetermined period is interposed in the said connection of said high frequency current to said line and at each said modulating means a device selectively responsive to said specific interrogation device having means to complete a connection over said predetermined period is interposed in said connection of said modulating means to said line.

2. A communication system comprising a transmission line for conventional usage and connected to said line at random points, (1) a source of high frequency current, (2) means to modulate said high frequency current, and (3) a detector of modulated high frequency current characterized in this that a specific interrogation device consisting of a selectively operated selecting means to complete a connection over a predetermined period is interposed in the said connection of said high frequency current to said line and at each of a plurality of distant stations, each containing a said modulating means, a device selectively responsive to said specific interrogation device having means to complete a connection over said predetermined period is interposed in said connection of said modulating means to said line.

3. A communication system comprising a transmission line for conventional usage and associated with said line at random points, (1) a source of high frequency current, (2) means to modulate said high frequency current, and (3) a detector of modulated high frequency current, characterized in this that a specific interrogation device is provided consisting of selectively operated means to complete a connection of said high frequency current to said line in coded trains of intervals including a final comparatively long interval providing an opportunity for the operation of a said modulating means and at each said modulating means a device is provided selectively responsive to said specific interrogation device having means to complete a connection between said line and said modulating means over said final comparatively long interval.

References Cited in the file of this patent

UNITED STATES PATENTS

| | | |
|---|---|---|
| 2,337,441 | Atkinson | Dec. 21, 1943 |
| 2,574,458 | Atkinson | Nov. 13, 1951 |
| 2,581,056 | Walmsley | Jan. 1, 1952 |
| 2,619,547 | Ross | Nov. 25, 1952 |
| 2,636,164 | Lubin | Apr. 21, 1953 |
| 2,842,753 | Ewen | July 8, 1958 |